(12) United States Patent
Norrga et al.

(10) Patent No.: US 8,614,904 B2
(45) Date of Patent: Dec. 24, 2013

(54) VOLTAGE SOURCE CONVERTER WITH SWITCHING CELL BYPASS ARRANGEMENT

(75) Inventors: Staffan Norrga, Stockholm (SE); Tomas U. Jonsson, Västerås (SE)

(73) Assignee: ABB Research Ltd., Zurich (CH)

( * ) Notice: Subject to any disclaimer, the term of this patent is extended or adjusted under 35 U.S.C. 154(b) by 455 days.

(21) Appl. No.: 12/933,357

(22) PCT Filed: Mar. 20, 2008

(86) PCT No.: PCT/EP2008/053394
§ 371 (c)(1),
(2), (4) Date: Nov. 4, 2010

(87) PCT Pub. No.: WO2009/115125
PCT Pub. Date: Sep. 24, 2009

(65) Prior Publication Data
US 2011/0044082 A1    Feb. 24, 2011

(51) Int. Cl.
*H02M 7/217* (2006.01)
*H02M 7/219* (2006.01)

(52) U.S. Cl.
USPC ............ 363/127; 363/34; 363/56.02; 363/95; 363/138

(58) Field of Classification Search
USPC ............ 363/16, 17, 34, 35, 37, 56.01, 56.02, 363/56.05, 56.12, 58, 81, 95, 98, 125, 127, 363/131, 132, 136–138
See application file for complete search history.

(56) References Cited

U.S. PATENT DOCUMENTS

| | | | |
|---|---|---|---|
| 5,177,428 A * | 1/1993 | Hirose et al. | 323/207 |
| 5,210,685 A * | 5/1993 | Rosa | 363/109 |
| 5,642,275 A | 6/1997 | Peng et al. | |
| 5,872,707 A * | 2/1999 | Asplund | 363/51 |
| 5,986,909 A * | 11/1999 | Hammond et al. | 363/65 |
| 6,222,284 B1 | 4/2001 | Hammond et al. | |
| 6,259,616 B1 * | 7/2001 | Ekwall et al. | 363/132 |
| 6,519,169 B1 * | 2/2003 | Asplund et al. | 363/132 |
| 6,603,675 B1 * | 8/2003 | Norrga | 363/132 |
| 6,898,095 B2 * | 5/2005 | Bijlenga et al. | 363/132 |
| 7,411,797 B2 * | 8/2008 | Norrga et al. | 363/17 |
| 2005/0083716 A1 * | 4/2005 | Marquardt | 363/132 |
| 2008/0232145 A1 | 9/2008 | Hiller et al. | |

FOREIGN PATENT DOCUMENTS

| | | |
|---|---|---|
| DE | 10103031 A1 | 7/2002 |
| DE | 10333798 A1 | 2/2005 |
| DE | 102005040543 A1 | 3/2007 |
| WO | WO 2007/023064 A1 | 3/2007 |

* cited by examiner

*Primary Examiner* — Adolf Berhane
*Assistant Examiner* — Nusrat Quddus
(74) *Attorney, Agent, or Firm* — Birch, Stewart, Kolasch & Birch, LLP

(57) ABSTRACT

A Voltage Source Converter having at least one phase leg connected to opposite poles of a direct voltage side of the converter and including a series connection of switching cells has an arrangement configured to apply a pressure to opposite ends of stacks of semiconductor assemblies for pressing the assemblies towards each other so as to obtain electric contact between semiconductor assemblies in the stack while ensuring that the semiconductor assemblies of a first path of each switching cell of the converter go into a permanently closed circuit state in case of a failure of the respective switching cell. A second path of each switching cell has a member configured to keep the second path including an energy storing capacitor non-conducting upon occurrence of the failure.

22 Claims, 4 Drawing Sheets

7: Switching cell
13: Control arrangement 10, 11, 12: Phase output
7″: Switching cell

VOLTAGE SOURCE CONVERTER WITH SWITCHING CELL BYPASS ARRANGEMENT

TECHNICAL FIELD OF THE INVENTION AND BACKGROUND ART

The present invention relates to a Voltage Source Converter having at least one phase leg connecting to opposite poles of a direct voltage side of the converter and comprising a series connection of switching cells, each said switching cell having at least two current paths between the terminals thereof with a first current path formed by one or more first semiconductor assemblies connected in series and having each a semiconductor device of turn-off type and a free-wheeling diode connected in parallel therewith, and a second path including a series connection of on one hand at least one second semiconductor assembly having a semiconductor device of turn-off type and a free-wheeling diode connected in parallel therewith and on the other at least one energy storing capacitor, a mid point of said series connection of switching cells forming a phase output being configured to be connected to an alternating voltage side of the converter, each said switching cell being configured to obtain two switching states by control of said semiconductor devices of each switching cell, namely a first switching state in which said first path is in a non-conducting state and the voltage across said at least one energy storing capacitor is applied across the terminals of the switching cell, and a second switching state, in which said first path is closed and a zero voltage is applied across the terminals of the switching cell, for obtaining a determined alternating voltage on said phase output.

Such converters with any number of said phase legs are comprised, but they have normally three such phase legs for having a three phase alternating voltage on the alternating voltage side thereof.

A Voltage Source Converter of this type may be used in all kinds of situations, in which direct voltage is to be converted into alternating voltage and conversely, in which examples of such uses are in stations of HVDC-plants (High Voltage Direct Current), in which direct voltage is normally converted into a three-phase alternating voltage or conversely, or in so-called back-to-back stations in which alternating voltage is firstly converted into direct voltage and this is then converted into alternating voltage, as well as in SVCs (Static Var Compensator), in which the direct voltage side consists of capacitors hanging freely. However, the present invention is not restricted to these applications, but other applications are also conceivable, such as in different types of drive systems for machines, vehicles etc.

A Voltage Source Converter of this type is known through for example DE 101 03 031 A1 and WO 2007/023064 A1 and is as disclosed there normally called a multi-cell converter or M2LC. Reference is made to these publications for the functioning of a converter of this type. Said switching cells of the converter may have other appearances than those shown in said publications, and it is for instance possible that each switching cell has more than one said energy storing capacitor, as long as it is possible to control the switching cell to be switched between the two states mentioned in the introduction.

Another Voltage Source Converter of this type is known through U.S. Pat. No. 5,642,275 used in a Static Var Compensator, in which the switching cells have a different appearance in the form of so-called full bridges.

The present invention is primarily, but not exclusively, directed to such Voltage Source Converters configured to transmit high powers, and the case of transmitting high powers will for this reason mainly be discussed hereinafter for illuminating but not in any way restricting the invention thereto. When such a Voltage Source Converter is used to transmit high powers this also means that high voltages are handled, and the voltage of the direct voltage side of the converter is determined by the voltages across said energy storing capacitors of the switching cells. This means that a comparatively high number of such switching cells are to be connected in series for a high number of semiconductor devices, i.e. said semiconductor assemeblies, are to be connected in series in each said switching cell, and a Voltage Source Converter of this type is particularly interesting when the number of the switching cells in said phase leg is comparatively high. A high number of such switching cells connected in series means that it will be possible to control these switching cells to change between said first and second switching state and by that already at said phase output obtain an alternating voltage being very close to a sinusoidal voltage. This may be obtained already by means of substantially lower switching frequencies than typically used in known Voltage Source Converters of the type shown in FIG. 1 in DE 101 03 031 A1 having switching cells with at least one semiconductor device of turn-off type and at least one free-wheeling diode connected in anti-parallel therewith. This makes it possible to obtain substantially lower losses and also considerably reduces problems of filtering and harmonic currents and radio interferences, so that equipment therefor may be less costly.

In a Voltage Source Converter of this type, where several switching cells may be connected in series in order to handle high voltages, reliability may be reduced since a failure in a single switching cell or semiconductor assembly thereof may jeopardize the operation of the entire converter. WO 2007/023064 discloses a solution to this problem by achieving redundancy. This is made by short-circuiting a failing switching cell by the arrangement of a by-pass switch. However, this puts high demands on the reliability of the means, i.e. the switch, used for short-circuiting the switching cell and it also requires provision of a reliable control of said means.

SUMMARY OF THE INVENTION

The object of the present invention is to provide a Voltage Source Converter of the type defined in the introduction addressing the problem of obtaining redundancy for handling failure of a switching cell thereof in a way being in at least some aspect more preferred than the solution already known.

This object is according to the invention obtained by providing a Voltage Source Converter of the type defined in the introduction, in which said first semiconductor assemblies of said switching cells are arranged in stacks comprising each at least one semiconductor assembly, the converter comprises an arrangement configured to obtain electric contact between semiconductor assemblies in said stack while ensuring that the semiconductor assemblies of said first path go into a permanently closed circuit state in case of a failure of the respective switching cell, and said second path of each switching cell has means configured to keep said second path non-conducting upon occurrence of a said failure.

By using the so-called press pack technique known through U.S. Pat. No. 5,705,853 for interconnecting the first semiconductor assemblies in said first path between the terminals of each switching cell it may be ensured that said first path will go into a permanently closed circuit state and by that the switching cell failing will be automatically by-passed upon occurrence of a failure thereof. Furthermore, the arrangement of said means in said second path of each switching cell ensures that said second path is kept non-conducting upon occurrence of a said failure, so that the energy storing capacitor will be disconnected in case of such a failure, which is very important for protecting other components of the converter. Thus, said means enables a good function of the press pack technique in the series connection of switching cells by ensuring that the capacitors will be "isolated" upon occurrence of a said failure. Accordingly, the present invention presents switching cells with an intrinsic reliability achieved by very simple means.

According to an embodiment of the present invention said means comprises a member configured to interconnect second semiconductor assemblies in said second path and configured to break and by that transfer said second path into an open circuit state upon occurrence of a said failure. This constitutes a reliable and cost efficient way of obtaining that said second path will be non-conducting upon occurrence of a said failure of a switching cell. An attractive way of obtaining this is defined in another embodiment of the invention, in which said member comprises at least one wire bonding second semiconductor assemblies to each other and configured to burn through and electrically disconnect said semiconductor assemblies by an over-current through this wire upon occurrence of a said failure. Such wire-bonded modules of semiconductor assemblies connected in series are less costly than modules in the form of stacks utilizing the so-called press pack technique, and this conventional way of interconnecting the second semiconductor assemblies may be used for obtaining a reliable disconnection of the energy storing capacitor in the case of a failure of the switching cell.

According to another embodiment of the invention said means comprises a member connected in series with said energy storing capacitor in said second path and configured to burn through by an over-current resulting in said second path therethrough upon occurrence of a said failure. It is then advantageous that this member is a fuse. This means that it would be possible to have also said second semiconductor assemblies stacked while using said press pack technique if this would be desired for keeping the dimensions of the converter as low as possible while still ensuring that the energy storing capacitor of a failing switching cell is disconnected upon occurrence of as said failure.

According to another embodiment of the invention said means comprises a member connected in series with said energy storing capacitor in said second path and configured to mechanically interrupt said second path therethrough upon occurrence of a said failure. The invention also covers the case of arranging a mechanical switch in said second path for isolating the energy storing capacitor upon occurrence of a said failure.

According to another embodiment of the invention said arrangement comprises means configured to apply a spring loaded pressure to each said stack urging the two ends of the stack towards each other while releasing potential energy stored in members of said means. Said members may be of any type storing potential energy when compressed and are according to another embodiment of the invention springs acting on at least one end of each said stack, in which said spring may be mechanical springs as well as other types of springs, such as gas springs. This means that electric contact between the semiconductor assemblies in said stack may be obtained with a high reliability irrespectively of irregularities in the dimension thereof, such as for instance in the case of parallel connection of semiconductor assemblies in said stack. There is also no risk that the interconnection of the adjacent semiconductor assemblies will be destroyed by the over-current resulting upon occurrence of a said failure making a faulty semiconductor assembly permanently conducting and accordingly by-passing the switching cell.

According to another embodiment of the invention each said switching cell has N said first semiconductor assemblies following upon each other in a said stack, in which N is an integer ≥2 or ≥4.

According to another embodiment of the invention the number of the switching cells of said phase leg is ≥4, ≥12, ≥30 or ≥50. A converter of this type is, as already mentioned above, particularly interesting when the number of switching cells of a said phase leg is rather high resulting in a high number of possible levels of the voltage pulses delivered on said phase output.

According to another embodiment of the invention said semiconductor device of the switching cell assemblies are IGBTs (Insulated Gate Bipolar Transistor), IGCTs (Integrated Gate Commutated Thyristor) or GTOs (Gate Turn-Off Thyristor). These are suitable semiconductor devices for such converters, although other semiconductor devices of turn-off type are also conceivable.

According to another embodiment of the invention said converter is configured to have said direct voltage side connected to a direct voltage network for transmitting High Voltage Direct Current (HVDC) and the alternating voltage side connected to an alternating voltage phase line belonging to an alternating voltage network. This is due to the high number of semiconductor assemblies required a particularly interesting application of a converter of this type.

According to another embodiment of the invention the converter is a part of a SVC (Static Var Compensator) with a direct voltage side formed by said energy storing capacitors of the switching cells and the alternating voltage phase output connected to an alternating voltage network. When a failure occur in a so-called full bridge switching cell of a converter of this type this switching cell is transferred into a half bridge cell of the M2LC-type, and it is then important that said first path goes into a permanently closed circuit state and said second path is kept non-conducting while disconnecting the energy storing capacitor of the switching cell upon occurrence of a further failure in the switching cell, and this is ensured by a converter according to this embodiment of the invention.

According to another embodiment of the invention the converter is configured to have a direct voltage across said two poles being 1 kV-1200 kV, 10 kV-1200 kV or 100 kV-1200 kV. The invention is the more interesting the higher said direct voltage is.

The invention also relates to a plant for transmitting electric power according to the appended claim therefor. The stations of such a plant may be given attractive dimensions and a high reliability to a low cost.

Further advantages as well as advantageous features of the invention will appear from the following description.

BRIEF DESCRIPTION OF THE DRAWINGS

With reference to the appended drawings, below follows a description of embodiments of the invention cited as examples.

In the drawings.

DETAILED DESCRIPTION OF EMBODIMENTS OF THE INVENTION

Figure 1:
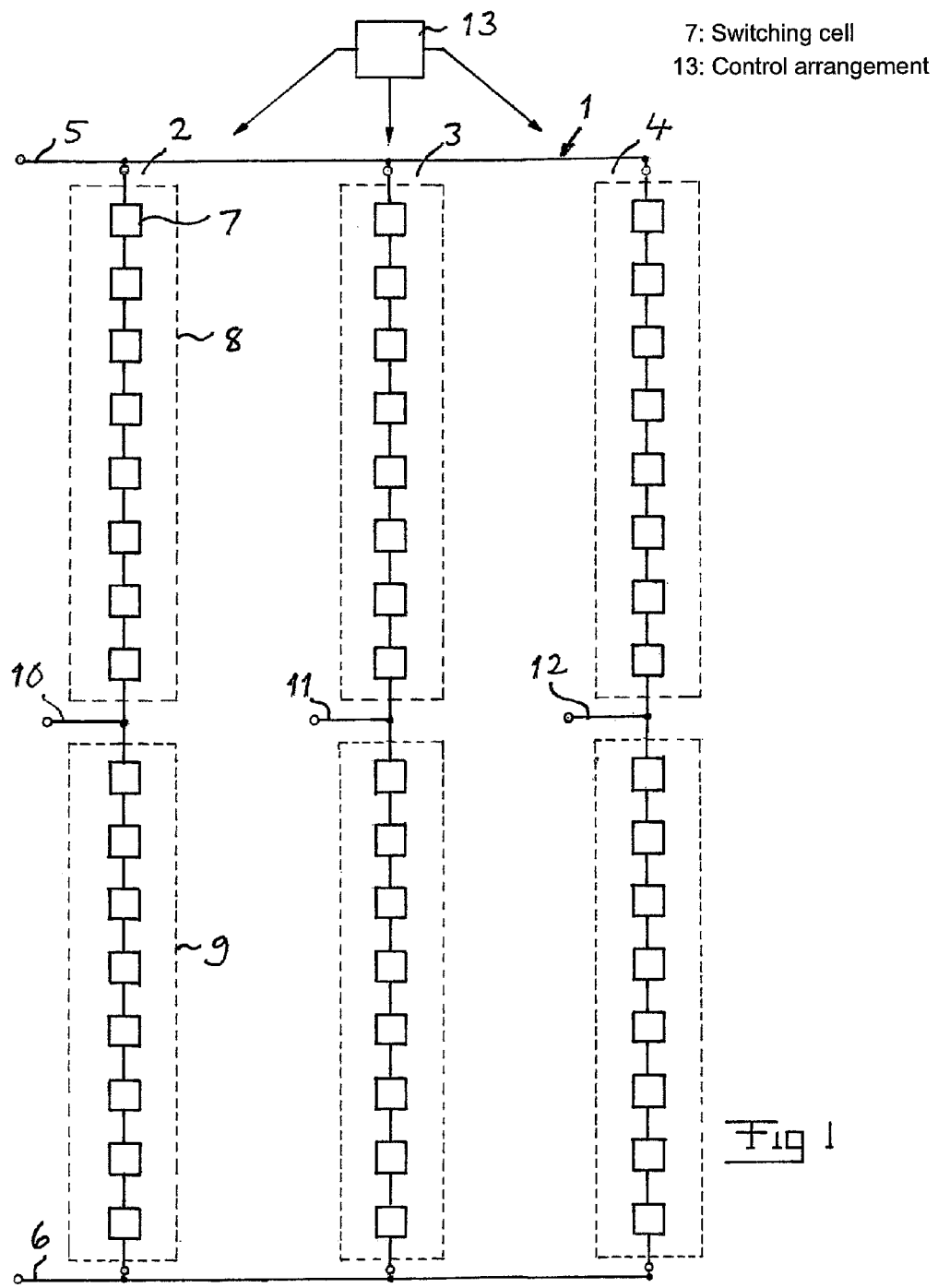
FIG. 1 is a very simplified view of a Voltage Source Converter of the type according to the present invention.

FIG. 1 illustrates very schematically the general construction of a Voltage Source Converter 1 of the type to which the present invention relates. This converter has three phase legs 2-4 connected to opposite poles 5, 6 of a direct voltage side of the converter, such as a direct voltage network for transmitting high voltage direct current. Each phase leg comprises a series connection of switching cells 7 indicated by boxes, in the present case 16 to the number, and this series connection is divided into two equal parts, an upper valve branch 8 and a lower valve branch 9, separated by a mid point 10-12 forming a phase output being configured to be connected to an alternating voltage side of the converter. The phase outputs 10-12 may possibly through a transformer connect to a three phase alternating voltage network, load, etc. Filtering equipment is also arranged on said alternating voltage side for improving the shape of the alternating voltage on said alternating voltage side.

A control arrangement 13 is arranged for controlling the switching cells 7 and by that the converter to convert direct voltage into alternating voltage and conversely.

Figure 2:
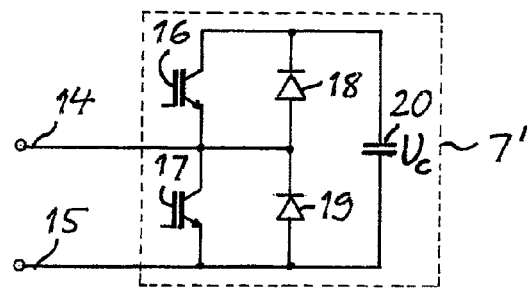
FIGS. 2 and 3 illustrates two different known switching cells, which may be a part of the Voltage Source Converter according to the invention.
Figure 3:
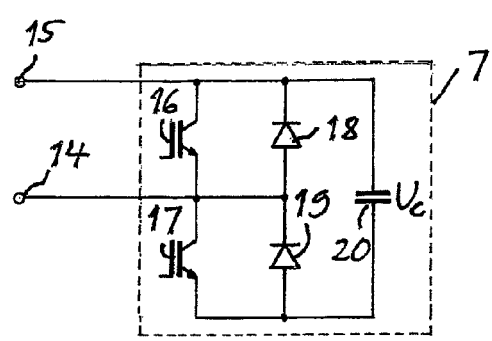

The Voltage Source Converter has switching cells 7 of the type having on one hand at least two semiconductor assemblies with each a semiconductor device of turn-off type, and a free-wheeling diode connected in parallel therewith and on the other at least one energy storing capacitor, and two examples of such switching cells are shown in FIG. 2 and FIG. 3. The terminals 14, of the switching cell are adapted to be connected to adjacent switching cells in the series connection of switching cells forming a phase leg. The semiconductor devices 16, 17 are in this case IGBTs connected in parallel with diodes 18, 19. Although only one semiconductor device and one diode is shown per assembly these may stand for a number of semiconductor devices and diodes, respectively, connected in parallel for sharing the current flowing through the assembly. An energy storing capacitor 20 is connected in parallel with the respective series connection of the diodes and the semiconductor devices. One terminal 14 is connected to the mid point between the two semiconductor devices as well as the mid point between the two diodes. The other terminal 15 is connected to the energy storing capacitor 20, in the embodiment of FIG. 2 to one side thereof and in the embodiment according to FIG. 3 to the other side thereof. It is pointed out that each semiconductor device and each diode as shown in FIG. 2 and FIG. 3 may be more than one connected in series for being able to handle the voltages to be handled, and the semiconductor devices so connected in series may then be controlled simultaneously so as to act as one single semiconductor device.

The switching cells shown in FIG. 2 and FIG. 3 may be controlled to obtain one of a) a first switching state and b) a second switching state, in which for a) the voltage across the capacitor 20 and for b) a zero voltage is applied across the terminals 14, 15. For obtaining the first state in FIG. 2 the semiconductor device 16 is turned on and the semiconductor device 17 turned off and in the embodiment according to FIG. 3 the semiconductor device 17 is turned on and the semiconductor 16 is turned off. The switching cells are switched to the second state by changing the state of the semiconductor devices, so that in the embodiment according to FIG. 2 the semiconductor device 16 is turned off and 17 turned on and in FIG. 3 the semiconductor device 17 is turned off and 16 turned on.

Figure 4:
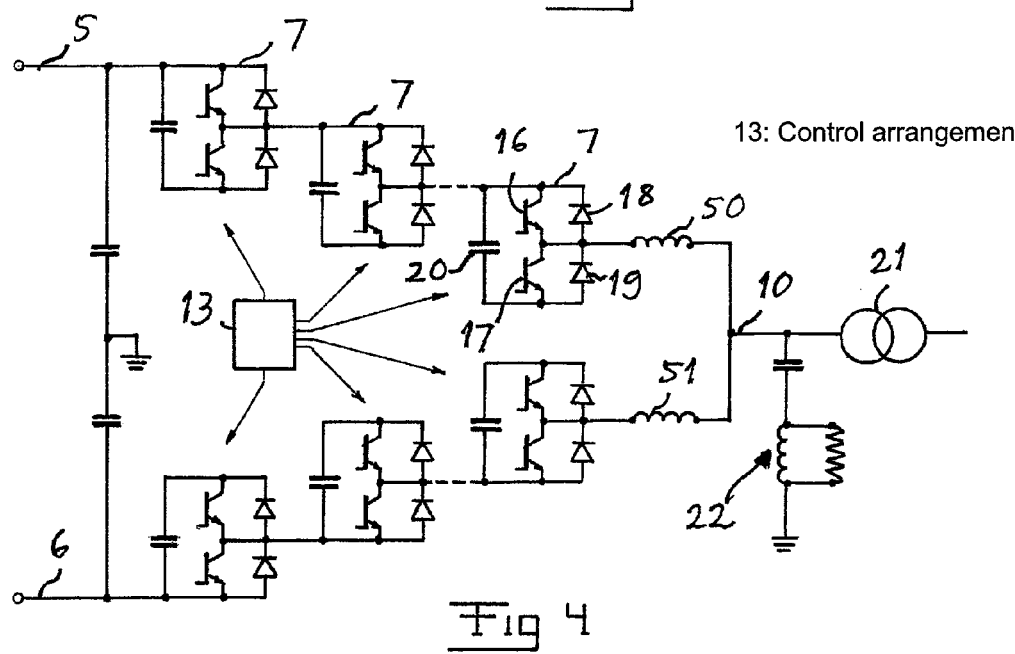
FIG. 4 is a simplified view very schematically illustrating a Voltage Source Converter according to the present invention.

FIG. 4 shows a little more in detail how a phase leg of the converter according to FIG. 1 is formed by switching cells of the type shown in FIG. 3, in which totally ten switching cells have been left out for simplifying the drawing. The control arrangement 13 is adapted to control the switching cells by controlling the semiconductor devices thereof, so that they will either deliver a zero voltage or the voltage across the capacitor to be added to the voltages of the other switching cells in said series connection. A transformer 21 and filtering equipment 22 are here also indicated. It is shown how each valve branch is through a phase reactor 50, 51 connected to the phase output 10, and such phase reactors should also be there in FIG. 1 for the phase outputs 10, 11 and 12, but have there been left out for simplifying the illustration.

Figure 5:
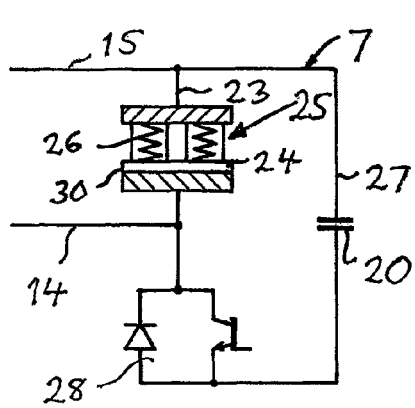
FIG. 5 is a simplified view very schematically illustrating a switching cell of the type shown in FIG. 3 as designed in a converter according to a first embodiment of the invention.

FIG. 5 illustrates very schematically the design of each switching cell 7 of the type shown in FIG. 3 of a Voltage Source Converter according to a first embodiment of the invention. Each switching cell has a first current path 23 formed by a plurality of first semiconductor assemblies 24 schematically indicated by a plate, connected in series and having each a semiconductor device of turn-off type and a free-wheeling diode connected in parallel therewith as shown in FIG. 3. An arrangement 25 is configured to apply a pressure to opposite ends of such a stack 30 of first semiconductor assemblies for pressing the assemblies towards each other so as to obtain electric contact between semiconductor assemblies in said stack. The arrangement has for this sake members storing potential energy in the form of springs 26 acting on at least one end of each said stack for urging the two ends of the stack towards each other while releasing potential energy stored therein. This so called press pack arrangement of said first semiconductor assemblies results in an interconnection thereof able to take very high currents.

The switching cell also comprises a second path 27 including a series connection of on one hand at least one second semiconductor assembly 28 having a semiconductor device of turn-off type and a free-wheeling diode connected in parallel therewith and on the other at least one energy storing capacitor 20.

When a failure occurs in the switching cell it is important that the switching cell is short-circuited and that the energy storing capacitor 20 may not be discharged through the second path 27. When a failure occurs the switching module constituted by the first semiconductor assemblies 24 and the switching module constituted of the second semiconductor assemblies 28 are opened. The discharge current from the capacitor 20 will then destroy the first semiconductor assemblies 24, so that these go into a permanently closed circuit state by-passing the switching cell 7. It is then also important that the second path 27 is kept non-conducting for disconnecting the capacitor 20 from the rest of the converter. This may be obtained in different ways. It is for instance possible to use IGCTs or GTOs which may block the voltage occurring in a failure case, as semiconductor devices in the second semiconductor assemblies, so that it is not necessary to transfer the second path into an open circuit state upon occurrence of a said failure for disconnecting the capacitor.

In the embodiment shown in FIG. 5 it is also possible that the second semiconductor assemblies 28 in the second path are interconnected by conventional wires configured to burn through by an over-current resulting in the second path therethrough upon occurrence of a failure.

Figure 6:
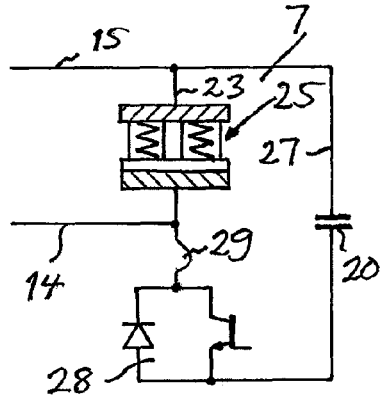
FIG. 6 is a view corresponding to FIG. 5 of a switching cell in a converter according to a second embodiment of the invention.

The switching cell in the embodiment shown in FIG. 6 differs from the one according to FIG. 5 by the arrangement of a member 29 connected in series with said energy storing capacitor in said second path 27 and configured to burn through by an over-current resulting in said second path therethrough upon occurrence of a said failure. This member is in this case a wire connecting the semiconductor assemblies to one terminal 14 of the switching cell.

Figure 7:
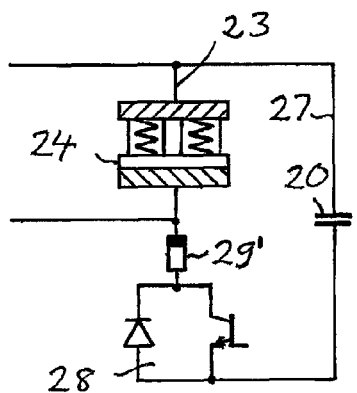
FIG. 7 is a view corresponding to FIG. 5 of a switching cell in a converter according to a third embodiment of the invention.

FIG. 7 illustrates a switching cell according to another embodiment of the invention, in which said member burning through is formed by a fuse 29'. In the two embodiments shown in FIGS. 6 and 7 it is even possible to use the so-called press pack technique for interconnecting the semiconductor assemblies 28 in the second path, since disconnection of the capacitor 20 is still ensured by the arrangement of the members 29 and 29', respectively. The member 29' in FIG. 7 may also stand for a mechanical switch configured to be opened upon occurrence of a said failure.

Figure 8:
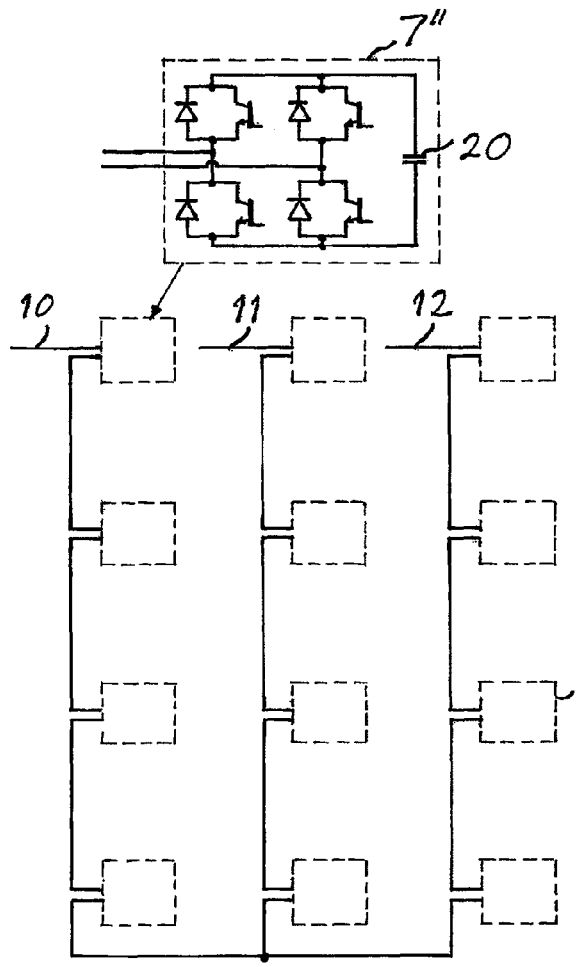
FIG. 8 illustrates very schematically a converter according to the present invention used in a Static Var Compensator, FIG. 9 schematically illustrates a switching cell of the converter shown in FIG. 8.

FIG. 8 illustrates the general construction of a Voltage Source Converter according to the present invention used in a Static Var Compensator for reactive power compensation. A direct voltage side of this converter is formed by said energy storing capacitors of the switching cells 7'', and the switching cells 7'' of this converter are so-called full bridges with semiconductor assemblies having a semiconductor device of turn-off type and a free-wheeling diode connected in parallel therewith as disclosed in U.S. Pat. No. 5,642,275.

Figure 9:
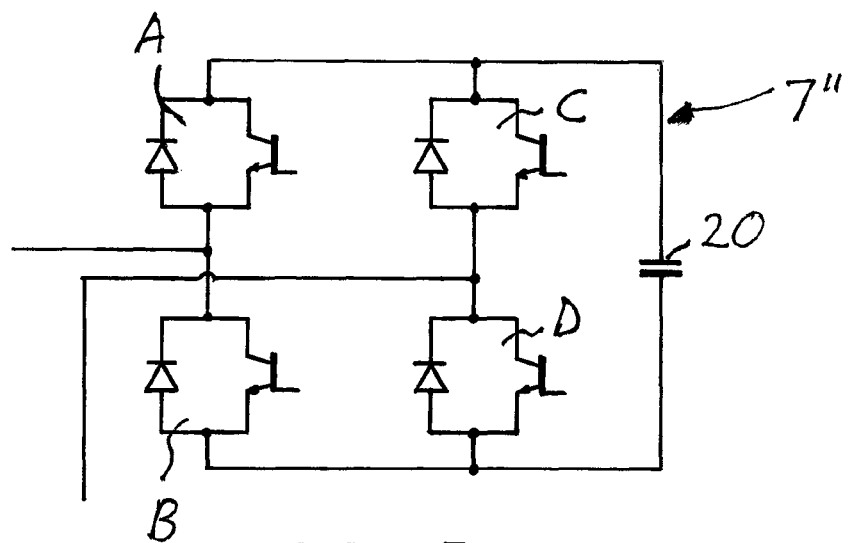
Figure 10:
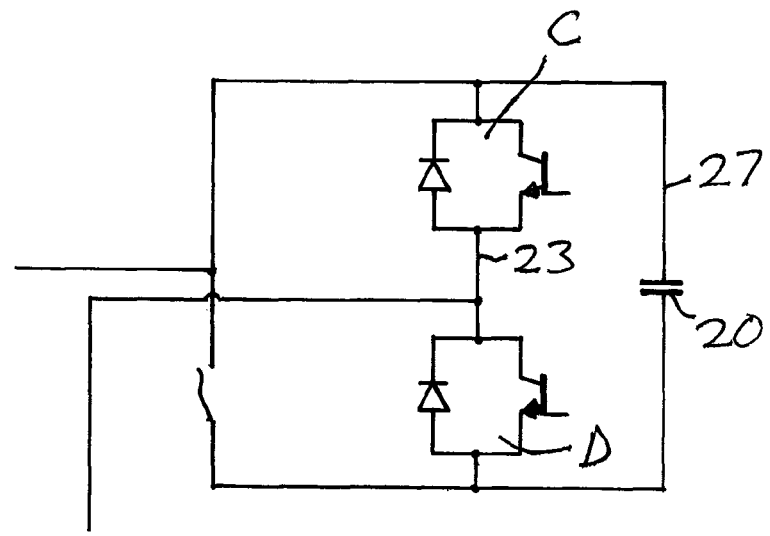
FIG. 10 illustrates what happens with the switching cell shown in FIG. 9 upon occurrence of a failure therein.

With reference made to FIGS. 9 and 10 we now assume that a failure appears in this switching cell 7''. This means that one of the modules A and B will be permanently conducting and the other will be turned off. We assume that A is the module turning into a permanently conducting state and the module B will be turned off, which will then result in a circuit according to FIG. 10, which corresponds to a switching cell according to FIGS. 5-7. The module C will then according to the invention be manufactured according to the press pack technique and the module D having the same feature as described for the second semiconductor assemblies 28 in the switching cells according to any of FIGS. 5-7. This means that when a further failure occurs in this switching cell the first path 23 will go into a permanently closed circuit state by destruction of the module C and the second path 27 will be transferred into a non-conducting state, such as a permanently open circuit state disconnecting the capacitor 20.

The invention is of course not in any way restricted to the embodiments described above, but many possibilities to modifications thereof will be apparent to a person with ordinary skill in the art without departing from the basic idea of the invention as defined in the appended claims.

It is pointed out that it is within the scope of the invention to have only one semiconductor assembly in each said stack and that only one semiconductor device of this assembly has to be arranged according to said press pack arrangement. It is then possible to have individual pressure contacts for each semiconductor device and diode as disclosed in U.S. Pat. No. 5,705,853. It is also possible to have disc type devices with wafer elements, where external pressure (e.g. in a pressurized stack) achieves the electric contact. The very schematic illustrations in FIGS. 5-7 are intended to cover these alternatives of use of the press pack technique.

The invention claimed is:

1. A multi-cell converter having at least one phase leg connecting to opposite poles of a direct voltage side of the converter and comprising a series connection of switching cells, each said switching cell having at least two current paths between first and second terminals thereof with a first current path formed by one or more first semiconductor assemblies connected in series and having each a semiconductor device of turn-off type and a free-wheeling diode connected in parallel therewith, and a second path including a series connection of on one hand at least one second semiconductor assembly having a semiconductor device of turn-off type and a free-wheeling diode connected in parallel therewith and on the other at least one energy storing capacitor, a mid point of said series connection of switching cells forming a phase output being configured to be connected to an alternating voltage side of the converter, wherein said first semiconductor assemblies of said switching cells are arranged in stacks comprising each at least one semiconductor assembly, the converter comprises an arrangement configured to obtain electric contact through semiconductor assemblies in said stack while ensuring that the semiconductor assemblies of said first path go into a permanently closed circuit state in case of a failure of the respective switching cell, and said second path of each switching cell has a member configured to keep said second path non-conducting upon occurrence of said failure.

2. The converter according to claim 1, wherein said member is configured to interconnect the second semiconductor assembly in said second path and configured to break and by that transfer said second path into an open circuit state upon occurrence of said failure.

3. The converter according to claim 2, wherein said member comprises at least one wire bonded the second semiconductor assembly to each other and configured to fuse and electrically disconnect said second semiconductor assembly by an over-current through this wire upon occurrence of said failure.

4. The converter according to claim 1, wherein said member is connected in series with said energy storing capacitor in said second path and configured to burn through by an over-current resulting in said second path therethrough upon occurrence of said failure.

5. The converter according to claim 4, wherein said member is a fuse.

6. The converter according to claim 1, wherein said member is connected in series with said energy storing capacitor in said second path and configured to mechanically interrupt said second path therethrough upon occurrence of said failure.

7. A multi-cell converter having at least one phase leg connecting to opposite poles of a direct voltage side of the converter and comprising a series connection of switching cells, each said switching cell having at least two current paths between two terminals thereof with a first current path formed by one or more first semiconductor assemblies connected in series and having each a semiconductor device of turn-off type and a free-wheeling diode connected in parallel therewith, and a second path including a series connection of on one hand at least one second semiconductor assembly having a semiconductor device of turn-off type and a free-wheeling diode connected in parallel therewith and on the other at least one energy storing capacitor, a mid point of said series connection of switching cells forming a phase output being configured to be connected to an alternating voltage side of the converter, wherein said first semiconductor assemblies of said switching cells are arranged in stacks comprising each at least one semiconductor assembly, the converter comprises an arrangement configured to obtain electric contact through semiconductor assemblies in said stack while ensuring that the semiconductor assemblies of said first path go into a permanently closed circuit state in case of a failure of the respective switching cell, and said second path of each switching cell has a member configured to keep said second path non-conducting upon occurrence of said failure, wherein said arrangement comprises a structure configured to apply a spring loaded pressure to each said stack urging the two ends of the stack towards each other while releasing potential energy stored in members of said structure.

8. The converter according to claim 7, wherein said members storing potential energy are springs acting on at least one end of each said stack.

9. The converter according to claim 1, wherein each said switching cell has N said first semiconductor assemblies following upon each other in said stack, in which N is an integer $\leq 2$ or $\leq 4$.

10. The converter according to claim 1, wherein the number of the switching cells of said phase leg is $\leq 4$, $\leq 12$, $\leq 30$ or $\leq 50$.

11. The converter according to claim 1, wherein semiconductor devices of the switching cell assemblies are IGBTs (Insulated Gate Bipolar Transistor), IGCTs (Integrated Gate Commutated Thyristor) or GTOs (Gate Turn-Off Thyristor).

12. The converter according to claim 1, wherein it is configured to have said direct voltage side connected to a direct voltage network for transmitting High Voltage Direct Current (HVDC) and the alternating voltage side connected to an alternating voltage phase line belonging to an alternating voltage network.

13. The converter according to claim 1, wherein it is a part of a SVC (Static Var Compensator) with a direct voltage side formed by said energy storing capacitors of the switching cells and the alternating voltage phase output connected to an alternating voltage network.

14. The converter according to claim 1, wherein it is configured to have a direct voltage across said two poles being 1 kV-1200 kV, 10 kV-1200 kV or 100 kV-1200 kV.

15. A plant for transmitting electric power comprising a direct voltage network and at least one alternating voltage network connected thereto through a station, said station being adapted to perform transmitting of electric power between the direct voltage network and the alternating voltage network and comprises at least one multi-cell converter adapted to convert direct voltage into alternating voltage and conversely, wherein in that said station of the plant comprises a multi-cell converter according to claim 1.

16. The converter according to claim 2, wherein said arrangement comprises a structure configured to apply a spring loaded pressure to each said stack urging the two ends of the stack towards each other while releasing potential energy stored in members of said structure.

17. The converter according to claim 2, wherein each said switching cell has N said first semiconductor assemblies following upon each other in a said stack, in which N is an integer $\leq 2$ or $\leq 4$.

18. The converter according to claim 2, wherein the number of the switching cells of said phase leg is $\leq 4$, $\leq 12$, $\leq 30$ or $\leq 50$.

19. The converter according to claim 2, wherein semiconductor devices of the switching cell assemblies are IGBTs (Insulated Gate Bipolar Transistor), IGCTs (Integrated Gate Commutated Thyristor) or GTOs (Gate Turn-Off Thyristor).

20. The converter according to claim 2, wherein it is configured to have said direct voltage side connected to a direct voltage network for transmitting High Voltage Direct Current (HVDC) and the alternating voltage side connected to an alternating voltage phase line belonging to an alternating voltage network.

21. The converter according to claim 2, wherein one end of the member is directly connected to the second terminal of the respective switching cell and said stack, and the other end of the member is directed connected to the second semiconductor assembly.

22. The converter according to claim 21, wherein the stack, the member and the second semiconductor assembly are connected in series in this order, and the second terminal is directly connected to a point between the stack and the member.

* * * * *